(12) United States Patent
Guracar

(10) Patent No.: US 7,654,959 B2
(45) Date of Patent: Feb. 2, 2010

(54) MOTION ARTIFACT REDUCTION IN COHERENT IMAGE FORMATION

(75) Inventor: Ismayil M. Guracar, Redwood City, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1051 days.

(21) Appl. No.: 10/654,525

(22) Filed: Sep. 3, 2003

(65) Prior Publication Data

US 2005/0049496 A1  Mar. 3, 2005

(51) Int. Cl.
*A61B 8/00* (2006.01)

(52) U.S. Cl. .................. 600/447; 600/443; 600/407; 600/409; 600/454; 600/455; 600/456; 600/444; 600/445; 600/446; 600/473; 73/625; 73/626; 342/179; 342/186; 342/463; 356/925; 356/928

(58) Field of Classification Search .......... 600/407, 600/409, 443–447, 454–456, 473, 476; 73/625–626; 367/7, 11, 87–88, 100, 103–105; 342/179–186; 342/463; 356/925, 928

See application file for complete search history.

(56) References Cited

U.S. PATENT DOCUMENTS

| | | | |
|---|---|---|---|
| 3,858,446 A * | 1/1975 | Flemons .................. 73/861.06 |
| 4,612,937 A * | 9/1986 | Miller ......................... 600/441 |
| 4,989,143 A * | 1/1991 | O'Donnell et al. .......... 600/437 |
| 5,054,045 A | 10/1991 | Whiting et al. |
| 5,111,825 A * | 5/1992 | Nishiyama et al. .......... 600/455 |
| 5,121,364 A * | 6/1992 | O'Donnell .................... 367/98 |
| 5,329,929 A * | 7/1994 | Sato et al. .................... 600/441 |
| 5,390,674 A | 2/1995 | Robinson et al. |
| 5,457,728 A | 10/1995 | Whiting et al. |
| 5,460,180 A * | 10/1995 | Klepper et al. .............. 600/447 |
| 5,605,154 A * | 2/1997 | Ries et al. .................... 600/444 |
| 5,623,928 A | 4/1997 | Wright et al. |
| 5,667,373 A | 9/1997 | Wright et al. |
| 5,779,640 A | 7/1998 | Holley et al. |
| 5,822,391 A | 10/1998 | Whititng et al. |
| 6,016,285 A | 1/2000 | Wright et al. |
| 6,168,565 B1 * | 1/2001 | Napolitano .................. 600/447 |
| 6,193,663 B1 | 2/2001 | Napolitano et al. |
| 6,228,031 B1 | 5/2001 | Hwang et al. |
| 6,309,357 B1 | 10/2001 | Guracar et al. |
| 6,482,157 B2 | 11/2002 | Robinson |
| 6,491,631 B2 * | 12/2002 | Chiao et al. ................. 600/443 |
| 6,527,717 B1 | 3/2003 | Jackson et al. |
| 2008/0175453 A1 | 7/2008 | Hao et al. |
| 2008/0214934 A1 | 9/2008 | Lee et al. |

\* cited by examiner

*Primary Examiner*—Brian Casler
*Assistant Examiner*—John F Ramirez

(57) ABSTRACT

The same analytic data is combined in response to different relative phases. The resulting combinations are detected. The combination associated with the maximum magnitude is then selected for further processing. As a result, the complex data is processed across a variety of possible temporal discontinuities using candidate or possible phase shifts. The phase shift with the least cancellation and the associated combination is selected to minimize motion artifact cancellation.

25 Claims, 6 Drawing Sheets

FIG.4

3D 2X2 BEAM ACQUISITION SEQUENCE: ALI

```
         AZIMUTH ⟶
   40
      +  +  +  +  +  +  +  +  ...
  1 ⌈ +  +  +  +  +  +  +  + ⌉
  2 ⌊ +  1  +  2  +  3  +  4  +  5 ⌋ +  + ... 42
  E       •  •  •  •  •  •  •  •  •  •  •  •
  L     + +  +  +  +  +  +  +  +  +  +  +
  E   3 + 13 + 14 + 15 + 16 + 17 + ...
  V     + +  +  +  +  +  +  +  +
  A   4 +  +  +  +  +  +  +  +  +
  T     + +  +  +  +  +  +  +  +  +  +  +
  I   5 + 25 + 26 + 27 + 28 + 29 + ...
  O     + +  +  +  +  +  +  +  +
  N   6 +  +  +  +  +  +  +  +  +
        + +  +  +  +  +  +  +  +  +  +  +
      7 + 37 + 38 + 39 + 40 + 41 +
        + +  +  +  +  +  +  +  +
      8 +  +  +  +  +  +  +  +  +
```

ELEVATION PROCESSING $x(1,:)$ $x(1,:) + x(2,:)$   ALI (INTERPOLATION)

$x(2,:)$

CHOOSE$(x(2,:) + e^{j\phi}x(3,:)); \phi = (0\ 90°\ 180°\ 270°)$ $x(3,:)$ $x(3,:) + x(4,:)$ $x(4,:)$ CHOOSE$(x(4,:) + e^{j\phi}x(5,:)); \phi = (0\ 90°\ 180°\ 270°)$ $x(5,:)$ $x(5,:) + x(6,:)$ $x(6,:)$ CHOOSE$(x(6,:) + e^{j\phi}x(7,:)); \phi = (0\ 90°\ 180°\ 270°)$ $x(7,:)$ $x(7,:) + x(8,:)$ $x(8,:)$

FIG. 5

3D 2×2 BEAM ACQUISITION SEQUENCE: ALI + SYNTHESIS

```
           AZIMUTH →
        + + + + + +
1       +┌─┐+ + + +      ... x(1,:)+x(2,:)                                      SYNTHESIS
   E    +│1│+ 3 4 5 +         CHOOSE(x(2,:)+e^(jφ)x(3,:))+x(1,:)+x(2,:) SYN+ALI
   L    +│ │+ + + + +         CHOOSE(x(2,:)+e^(jφ)x(3,:)):φ=(0 90° 180° 270°) SYN
2  E    +│2│+ + + + +
   V    +└─┘+ + + + +
        + + + + + +
3  A    + + + + + +      ... CHOOSE(x(2,:)+e^(jφ)x(3,:))+e^(jφ)x(3,:)+x(4,:) SYN+ALI
   T    13 14 15 16 17        x(3,:)+x(4,:)                                      SYNTHESIS
4  I    + + + + + +
   O    + + + + + +
5  N    + + + + + +           CHOOSE(x(4,:)+e^(jφ)x(5,:))+x(3,:)+x(4,:) SYN+ALI
   ─    25 26 27 28 29        CHOOSE(x(4,:)+e^(jφ)x(5,:)):φ=(0 90° 180° 270°)
6       + + + + + +      ... x(5,:)+x(6,:)                                      SYNTHESIS
        + + + + + +
7       + + + + + +           CHOOSE(x(6,:)+e^(jφ)x(7,:))+x(5,:)+x(6,:) SYN+ALI
        37 38 39 40 41        CHOOSE(x(6,:)-e^(jφ)x(7,:)):φ=(0 90° 180° 270°)
8       + + + + + +      ... x(7,:)+x(8,:)                                      SYNTHESIS
        + + + + + +
```

ELEVATION PROCESSING

Row 1: ... $x(1,:)+x(2,:)$    SYNTHESIS
Row 2: CHOOSE$(x(2,:)+e^{j\phi}x(3,:))+x(1,:)+x(2,:)$ SYN+ALI
Row 2: CHOOSE$(x(2,:)+e^{j\phi}x(3,:)):\phi=(0\ 90°\ 180°\ 270°)$ SYN
Row 3: CHOOSE$(x(2,:)+e^{j\phi}x(3,:))+e^{j\phi}x(3,:)+x(4,:)$ SYN+ALI
Row 3: ... $x(3,:)+x(4,:)$    SYNTHESIS
Row 4: CHOOSE$(x(4,:)+e^{j\phi}x(5,:))+x(3,:)+x(4,:)$ SYN+ALI
Row 5: CHOOSE$(x(4,:)+e^{j\phi}x(5,:)):\phi=(0\ 90°\ 180°\ 270°)$
Row 5: ... $x(5,:)+x(6,:)$    SYNTHESIS
Row 6: CHOOSE$(x(6,:)+e^{j\phi}x(7,:))+x(5,:)+x(6,:)$ SYN+ALI
Row 7: CHOOSE$(x(6,:)-e^{j\phi}x(7,:)):\phi=(0\ 90°\ 180°\ 270°)$
Row 8: ... $x(7,:)+x(8,:)$    SYNTHESIS

FIG.6

3D 2x2 BEAM ACQUISITION SEQUENCE: ALI WITH
ELEVATION BLOCK MODE

```
      AZIMUTH →
40
⎧ ⎡+  +⎤ +  +  +  +  +  +  +  +
⎨ ⎢+ 1+⎥ 3  5  7  9  +  +  +  +
  ⎣+  +⎦ +  +  +  +  +  +  +  +
   +  +  +  +  +  +  +  +  +  +
   +  2  4  6  8  A  +  +  +  +
E  +  +  +  +  +  +  +  +  +  +
L  +  +  +  +  +  +  +  +  +  +
E  +  B  D  F  H  K  +  +  +  +
V  +  +  +  +  +  +  +  +  +  +
A  +  +  +  +  +  +  +  +  +  +
T  +  C  E  G  I  J  +  +  +  +
I  +  +  +  +  +  +  +  +  +  +
O
N
|
↓
```

ELEVATION PROCESSING x(1,:)
x(1,:)+x(2,:)       INTERPOLATION
x(2,:)
x(2,:)+x(3,:)
x(3,:)
x(3,:)+x(4,:)
x(4,:)
CHOOSE(x(4,:)+e^{jφ}x(5,:)); φ=(0 90° 180° 270°)
x(5,:)
x(5,:)+x(6,:)
x(6,:)
x(6,:)+x(7,:)
x(7,:)
x(7,:)+x(8,:)
x(8,:)

| ANGLE | COMPLEX MULTIPLIER | RESULT |
|---|---|---|
| 0 | I | I+jQ |
| 45° | 0.707+0.707j | 0.707I−0.707Q+j(0.707I+0.707Q) |
| 90° | j | −Q+jI |
| 135° | −0.707+0.707j | −0.707I−0.707Q+j(0.707I−0.707Q) |
| 180° | −I | −I−jQ |
| 225° | −0.707−0.707j | −0.707I+0.707Q+j(−0.707I−0.707Q) |
| 270° | −j | Q−jI |
| 315° | 0.707−0.707j | 0.707I+0.707Q+j(−0.707I+0.707Q) |

MOTION ARTIFACT REDUCTION IN COHERENT IMAGE FORMATION

BACKGROUND

The present invention relates to analytic processing. Motion artifacts are reduced for coherent image formation.

For analytic processes in ultrasound imaging, predetected or complex data representing different lines in response to a same or different transmission and/or representing a same line in response to different transmissions is combined. For example, line synthesis is performed where complex data is combined in a filtering operation. As another example, analytic lines are interpolated from two adjacent lines of received complex data. Lateral whitening or other line-to-line filtering on predetected or analytic data may be performed.

Where combined data is responsive to transmissions separated by a delay, such as a delay associated with acquiring one or more Doppler samples, the phase of the complex data between two lines or acquisitions may be undesirably shifted due to tissue motion. If enough motion occurs between correlated lines, a motion artifact may be generated due to the analytic processing. For example, tissue motion at thirteen cm per second results in about 130 micrometers of motion in one millisecond. In a two-tap analytic filter, such as for line synthesis or interpolation at 2.5 MHz imaging frequency, the tissue motion corresponds to a 180° error. Two, three, or other numbers of taps for filtering analytic data may result in some cancellation due to tissue motion. Tissue motion of this speed is typical of the mitral valve. When the complex data is combined, the 180° phase shift due to the tissue motion cancels out the signal, resulting in a motion artifact. Small amounts of motion may produce varying amounts of cancellation. FIG. 1 shows a relationship of phase error to attenuation for one example of a two-tap synthesis or interpretation analytic process. A zero degree phase error shows zero dB or no drop out. A 180° phase error produces complete cancellation.

Motion resulting in multiple wave length changes between acquisitions of data to be combined may produce completely incoherent information in both amplitude and phase. Motion artifacts are generated as a function of both the delay between acquisitions of complex data to be combined and the amount of motion. Motion artifacts are generated even for short delays where the tissue is subjected to rapid motion. Very little motion may still create motion artifacts where long delays are provided between acquisitions.

Analytic line motion artifacts are reduced by video filtering the resulting detected data. Spatial, such as azimuth, smoothing reduces line artifacts. Since line artifacts are more likely apparent on edges of images or at steering angles away from normal to the transducer, any video filtering may vary on a line-by-line or beam-by-beam basis to remove expected artifact signals. However, spatial filtering or video filtering may reduce spatial resolution.

One common source of analytic line motion artifact is the delay provided between acquisitions of B-mode information for acquiring Doppler information. Where line-by-line of group of line interleaving is provided between B-mode and Doppler information, the delay to acquire Doppler information may result in motion artifacts in the B-mode images. To counteract the motion artifacts, one or more scan lines are reprimed. For example, data is acquired along a first scan line for B-mode imaging. Subsequently, data is acquired for Doppler imaging. Where data along the first scan line is going to be combined analytically with data along a second scan line acquired after the Doppler pulses, the data along the first scan line is reacquired to avoid a large delay and resulting motion artifact. Where analytic data representing three or more scan lines is combined, additional firings for repriming or reacquiring data may be used. As a result, the frame rate for B-mode imaging is decreased, resulting in lesser temporal resolution.

BRIEF SUMMARY

The present invention is defined by the following claims, and nothing in this section should be taken as a limitation on those claims. By way of introduction, the preferred embodiments described below include methods and systems for motion artifact reduction in coherent image formation. The same analytic data is combined in response to different relative phases. The resulting combinations are detected. The combination associated with the maximum magnitude is then selected for further processing. As a result, the complex data is processed across a variety of possible temporal discontinuities using candidate or possible phase shifts. The phase shift with the least cancellation and the associated combination is selected to minimize motion artifact cancellation.

In a first aspect, a method for correcting phase errors in coherent image formation is provided. At least two different relative phases are applied between the analytic data received in response to temporarily different transmissions. A selection is made associated with one of the different relative phases.

In a second aspect, a method for correcting phase errors in coherent image formation is provided. Ultrasound data is analytically processed along scan lines spaced in both elevation and azimuth dimensions. Motion between acquisitions of analytic data along two different scan lines is compensated as a function of a relative phase angle. The two scan lines represented by the data are spaced along the elevation dimension.

In a third aspect, a method for correcting phase errors in coherent image formation is provided. Complex data from at least two acquisitions is filtered without interpolation. A relative phase angle between the complex data between the two acquisitions is determined as a function of motion between the acquisitions. The filtering is adjusted as a function of the relative phase angle.

In a fourth aspect, a system for correcting phase errors in coherent image formation is provided. A complex filter is operable to receive data and operable to output two different combinations of the received data responsive to two different phase angles. A detector is operable to detect the outputs. A switch is operable to select one of the outputs in response to the detector.

Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the principals of the invention. Moreover, in the figures, like reference numerals designate corresponding parts throughout the different views.

FIGS. 4-6 show different example embodiments of scan line sequences for three dimensional imaging and associated analytic processing;

DETAILED DESCRIPTION OF THE DRAWINGS AND PRESENTLY PREFERRED EMBODIMENTS

Analytic data is combined coherently in two or more different ways, such as in response to two or more different phase angles. Since motion artifact cancels information, a combination associated with a maximum or greatest amount of signal content is selected for further processing. The motion artifact is minimized in resulting images. The motion compensation is applied across either azimuth and/or elevation dimensions. As a result, analytic processing may be used for three dimensional processing. Three dimensional imaging with improved frame rates may result.

Figure 2:
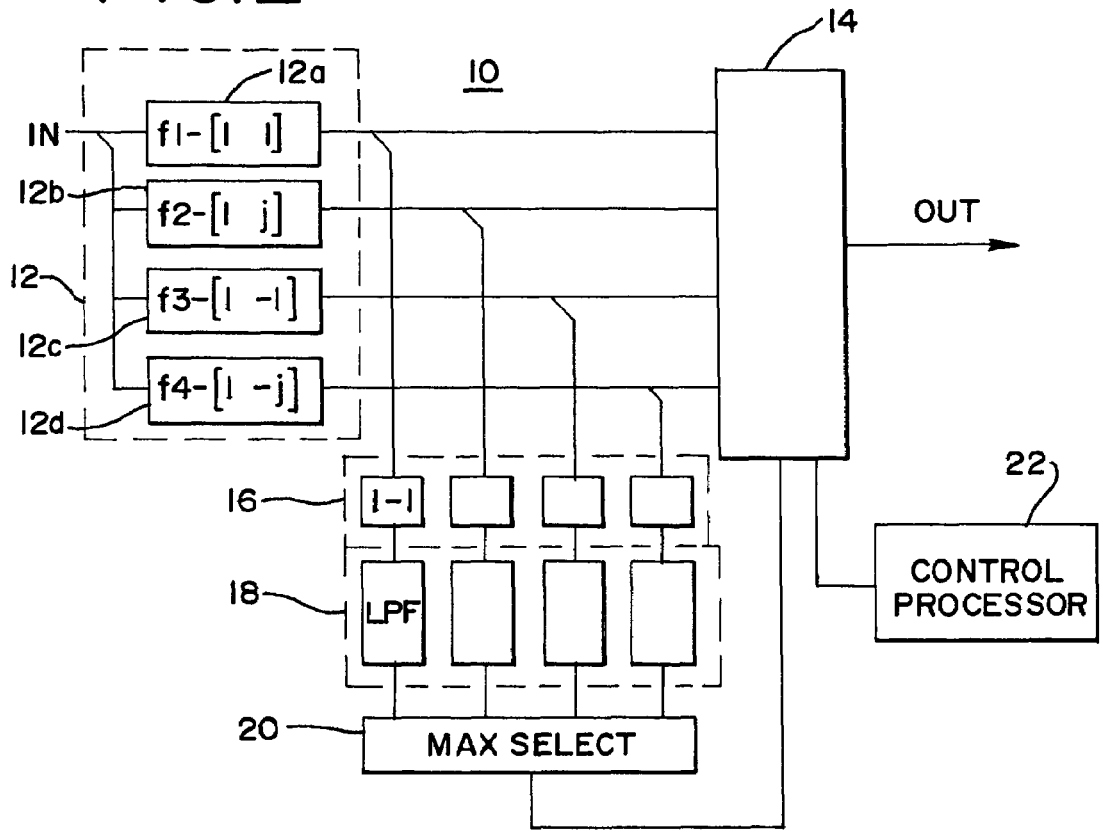
FIG. 2 is a block diagram of one embodiment of a system for reducing motion artifacts associated with phase errors in coherent image formation.

FIG. 2 shows a system 10 of one embodiment for correcting motion artifact induced phase errors in coherent image formation. The system 10 includes a complex filter 12, a switch 14, a detector 16, a low pass filter 18 and a comparator 20. Additional, different or fewer components may be provided. In one embodiment, the system 10 is within a receive beamformer of a medical diagnostic ultrasound system. Beamformed complex or analytic data, such as in-phase and quadrature or radio frequency data, is provided from a buffer or in sequence to the system 10. For example, the system 10 is positioned after a base band filter and prior to a detector of a medical diagnostic ultrasound system. The system 10 is part of, independent of or positioned sequentially with phase rotators or other devices for adjusting phase prior to analytic combination. For example, a phase correction as a function of scan line position or frequency is provided as discussed in U.S. Pat. No. 6,016,285, the disclosure of which is incorporated by reference herein. The additional relative phase corrections discussed herein are implemented by a same phase rotator or a subsequent phase rotation or combination. In one embodiment, one component, all components, or a subset of the components of the system 10 are implemented in a single or a combination of field programmable gate arrays.

The complex filter 12 is a finite impulse response filter, infinite impulse response filter, digital signal processor, application specific integrated circuit, processor, multipliers, coefficient memories, summers, subtractors, digital components, analog components or other devices now known or later developed for combining analytic or complex data. For example, two sets of data associated with different times of acquisition are provided as in-phase and quadrature samples to the complex filter 12. The complex filter 12 is operable to combine one set of analytic data with the other set of analytic data, such as combining the in-phase values of one set with the in-phase values of the other set and sequentially or in parallel combining the Q values of one set with the Q values of another set.

In one embodiment, the complex filter 12 sequentially combines the same data multiple times. In an alternative embodiment, two or more, such as four, complex filters 12a-d are provided in parallel. Each of the complex filters 12a-d combines the same data in response to different relative phase angles. For example, one complex filter 12a combines data with a zero degree relative phase angle, a second complex filter 12b combines data with a 90° phase angle, a third complex filter 12c combines the data with a 180° phase angle, and a fourth complex filter 12d combines the data with a minus 90° or a 270° phase angle. The complex filters 12a-d shown in FIG. 2 combine two different sets of analytic data. In alternative embodiments, three or more sets of analytic data are combined for interpolation or filtering.

Figure 1:
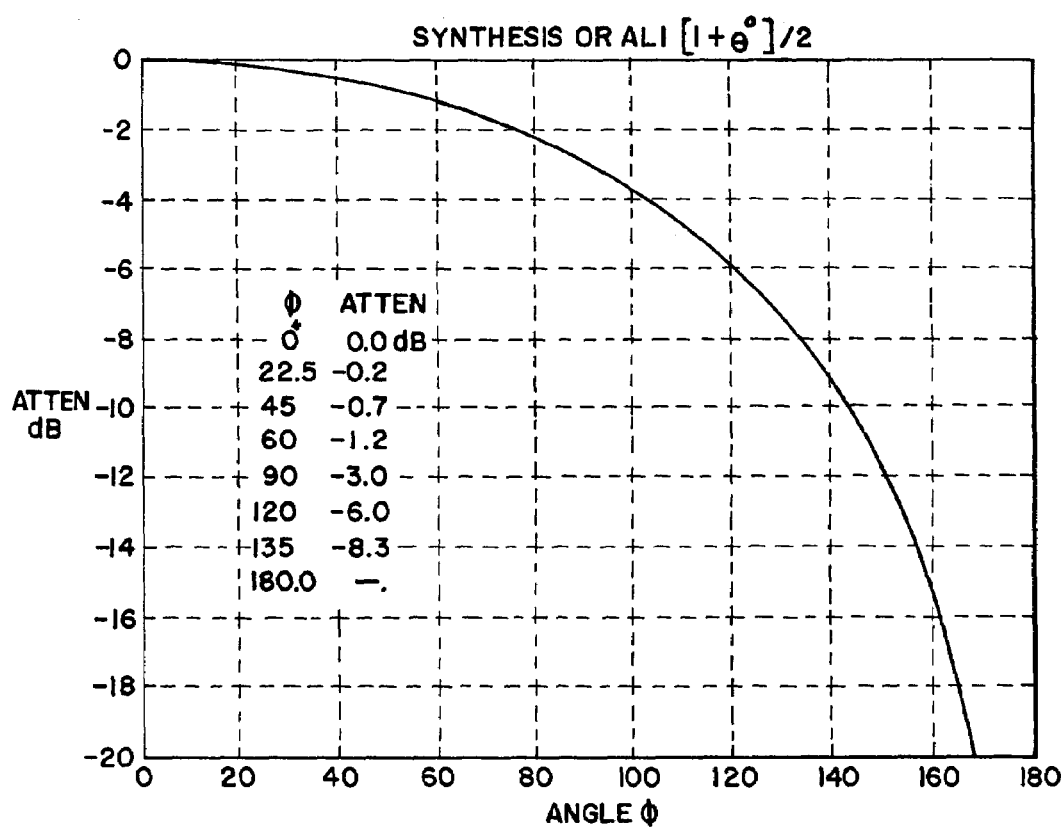
FIG. 1 is a spectral diagram showing cancellation associated with motion artifact induced phase errors between combined analytic data.

While four different phase angles are applied in the system 10 shown in FIG. 1, two, three, five or more different relative phase angles may be used. The cancellation due to motion artifacts and analytic possessing is related to the maximum phase error assuming perfect coherence without motion between two acquisitions. The magnitude of the cancellation depends on the relative phase induced by the motion. Zero phase is assumed to provide perfect or maximum coherence, resulting in no or minimal cancellation. Other phases may be associated with maximum coherence, such as where a different relative phase is used for transmissions. Two sets of data are combined in a two-tap line synthesis or azimuthal filter in one embodiment. Zero and 180° phases are used for example. One of the two sets of combined data is selected further for processing so that the maximum possible error due to motion artifact is only a ninety degree phase error. As shown in FIG. 1, a phase error of ninety degrees may provide about a 3 dB drop out in image intensity. A 3 dB drop out is substantially less than the almost infinite drop out provided by a complete cancellation. Using three different relative phases equally spaced around the unity circle, a maximum error may be around sixty degrees, corresponding to a maximum 1.2 dB cancellation. With four phases, the maximum error is forty-five degrees, corresponding to a 0.7 dB drop out.

Where a different number of sets of complex data are combined, such as using a three, four or five-tap azimuthal filter, different amounts of relative drop out for different numbers of phase angles may result. For example, analytic data associated with sequential transmissions along two lines being combined with analytic data associated with a third line and a temporal gap in acquisition may not result in absolute cancellation. However, by applying different possible phase corrections, the amount of drop out may be minimized. The amount of drop out is a function of an even or odd number of lines of data being filtered or combined and the position of larger temporal gaps between acquisitions relative to the lines being combined. For example, if motion occurs during a large gap in acquisition time between lines two and three of a four line combination, complete cancellation may result. As another example in the same four line combination, if the temporal gap and associated motion occur between the first and second or third and fourth lines to be combined, absolute cancellation may be avoided. Applying different phases may still lessen any cancellation even in this example.

Figures 7, 8:
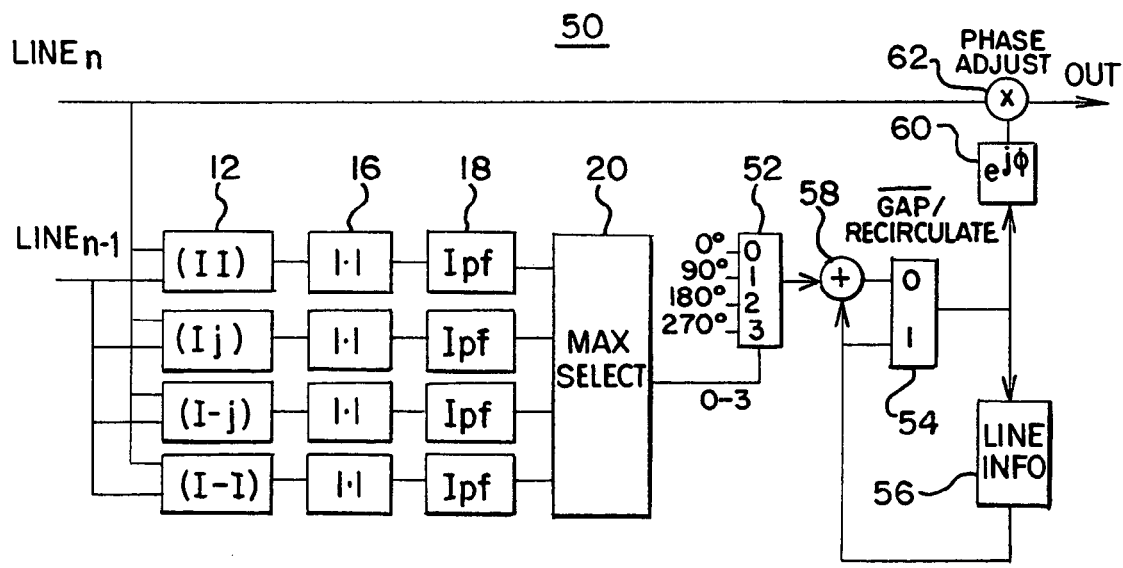
FIG. 7 is a table showing combinations at different phase angles.
FIG. 8 is a block diagram of an embodiment of an alternative to the system of FIG. 2.

Depending on the type of combination, more or fewer combinations in response to different phase angles may be provided. For a two-tap or combination or two sets of analytic data associated with a temporal gap in acquisition, four different combinations are provided in the embodiment represented in FIG. 2. The relative phase shifts for the four filters are implemented by negating either of the in-phase or quadrature values and alternating the position of the in-phase or quadrature values. For example, zero degrees of phase is provided by combining the I and Q information without alteration. 180° of phase is provided by negating both the in-phase and quadrature components (−I/Q) for the combination. Ninety degrees of phase is provided by swapping or exchanging the in-phase and quadrature data (Q/I). Minus 90° phase is provided by swapping and inverting the in-phase and quadrature data (−Q/−I). Additional phases are implemented in other embodiments. For example, eight different phases are implemented by scaling each of the four different phase implementations discussed above with the square root of 2 divided by 2. FIG. 7 shows a table of eight different combinations at eight different phase angles. Additional phase may be implemented using other now known or later developed processes.

Each of the outputs or different combinations of the same data in response to different phase angles is output to the switch 14 and the detectors 16. The detectors 16 are each a digital signal processor, application specific integrated circuit, filter, digital devised, analog devised, or other now known or later developed circuit for detecting an intensity, magnitude, amplitude, envelope or other characteristic of the coherent or complex data. As shown, the detector 16 is different device than a B-mode detector, Doppler detector or other detectors of the ultrasound system. In alternative embodiments, the detector 16 is also the B-mode, Doppler or other detector used for generating ultrasound images. In one embodiment, a separate magnitude detector is provided for each of the outputs from the complex filter 12. In alternative embodiments, a sequential process with a buffer or memory is used to sequentially detect the various outputs of the complex filter 12. In the embodiment shown in FIG. 2, four detectors are provided where each detector is operable to detect a magnitude of one of the four outputs of the complex filters 12a-d.

In one embodiment, a log function is performed on each of the detected magnitudes. As a result, the output of the detector 16 shown in FIG. 2 is mathematically represented as:

$Y_a(n) = \log\{abs\{X_1(n) + X_2(n)\}\}$ $Y_b(n) = \log\{abs\{X_1(n) + e^{j\pi/2}X_2(n)\}\}$ $Y_c(n) = \log\{abs\{X_1(n) + e^{-j\pi/2}X_2(n)\}\}$ $Y_d(n) = \log\{abs\{X_1(n) + e^{j\pi}X_2(n)\}\}$, where $X_1(n)$ and $X_2(n)$ represent lines of complex data to be combined in a two-tap filter and n is the range index along the line. Equation one shows combination in response to four different phases.

The low pass filter 18 is a finite impulse response, infinite impulse response or other now known or later developed filter using transistors, a processor, analog components, digital components or other devices for filtering the magnitude outputs of the detector 16. In one embodiment, a box car low pass filter is implemented, but other low pass filters may be used. In one embodiment, the filter 18 is a range filter for filtering along a moving window or over a select block of data associated with a range along scan lines.

The length of the low pass filter is selected as a function of the likely speckle size. Low pass filtering more likely identifies magnitude associated with signal rather than speckle or other noise. In one embodiment, the length of the low pass filter is ten samples. The length is set as a function of the imaging application, but may be adaptive to a measured bandwidth, frequency of operation or other characteristics. Any number of separate low pass filters may be used, such as a four low pass filters, one for each of the combinations and associated different phase angles shown in FIG. 2. Lesser or greater numbers of low pass filters may be provided for a same, lesser, or greater number of different combinations using parallel and/or sequential processing. In one embodiment, the low pass filter 18 has five to ninety-nine different taps or inputs for filtering in a moving window along an entire or over only a portion of a scan line depth. In alternative embodiments, a block or section of each scan line is isolated and input to the filter 18 for making a determination associated with each sample along that block of depth. The block size is of any possible size, such as associated with dividing the scan line depth into a plurality of sub blocks.

The comparator 20 is a digital comparator, analog comparator, digital signal processor, application specific integrated circuit, digital circuit, analog circuit or other now known or later developed device for selecting. One of the detected or low pass filtered detected combinations and associated relative phase angle is selected by the comparator 20. For example, the combination and associated phase angle resulting in a maximum magnitude is selected for further processing. Using the switch 14, the analytic or complex data is selected for further processing. The comparator 20 outputs a selection index or control signal to the switch 14 for selecting the output of one of the complex filters 12a-d. In alternative embodiments, detected and low pass filtered data is selected for further processing.

While low pass filtered magnitude data is used in one embodiment, the maximum or other selection may be performed on magnitude squared information. A subsampling of the low pass filtered data may be used for selecting the combination and associated relative phase angle for a group or all samples along a scan line.

The comparator 20 implements a thresholding function in one embodiment. If each of the magnitude values responsive to different phase angles have similar magnitudes, the analytic data may be incoherent, such as the result of a large amount of motion or thermal noise. If the maximum and minimum magnitudes are within a range, then the incoherent combination associated with a selected one of the complex filters 12a-d is selected and may or may not be further altered. Downstream video filter coefficients may be altered in recognition of the incoherence detected by the comparator 20. In yet another embodiment, a signal to noise ratio is measured. For poor signal-to-noise ratio operation, zero phase angle is used for combination without any choosing between different phase angles. In alternative embodiments, different phase angles are chosen even for poor signal-to-noise ratios.

The switch 14 is a multiplexer, transistor, processor, digital signal processor, application specific integrated circuit, analog switch, digital switch, relay or any now known or later developed devices for selecting between multiple inputs. The switch 14 selects one of the outputs of the complex filter 12 in response to the detector 16 and comparison of the detected data by the comparator 20. For example, the comparator 20 outputs an index or control signal identifying an output of the complex filter associated with the maximum magnitude detected by the detector 16. Where low pass filtering is provided by the low pass filter 18, the selection is responsive to the low pass filtering. The output of the switch 14 is passed for further processing, such as for spatial filtering (e.g., 1, 2 or 3 dimensional special filtering), temporal persistence, detection, scan conversion and display of a 1, 2 or 3 dimensional image.

In one embodiment, a control processor 22 also connects with the switch 14. Alternatively, the control processor 22 connects with the comparator 20, the complex filter 12 and/or acts to route data on a different path within the system 10. The control processor 22 is a digital signal processor, application specific integrated circuit, general processor, control processor, digital circuit, analog circuit or other known or later developed device for controlling the system 10. The control processor 22 is operable to select different sets of analytic data for motion artifact correction by the system 10. For example, the control processor 22 controls the complex filter 12 and the switch 14 to output analytic data combined with a 0 degree relative phase angle where the complex data being combined is sequentially acquired with a small or minimal temporal gap. For example, a three hundred microsecond or less than one millisecond delay is provided between acquisitions of each of the sequential sets of data to be combined. Where a greater temporal separation is provided between any two sets of the complex data in a combination, such as a greater than one millisecond, 1.2 millisecond or other delays, the control processor 22 implements the use of different phase adjustments and associated selection to correct for motion artifact. Different temporal distinctions may be provided, such as a function of the depth of a scan or imaging frequency. In alternative embodiments, the different combinations using different relative phase angles and selection of one combination is performed for any or all analytic processing.

The system 10 implements a feed forward path based on parallel detection and selection processing, simplifying implementation and through-put rate. In alternative embodiments, analytic data is stored for subsequent combination in response to feedback from a detection stage, such as a Doppler tissue detector for determining an amount of motion between the acquisitions of the stored data. Feedback may be used to determine a combination with minimal or reduced motion artifact cancellation without application of multiple different relative phases.

FIG. 8 shows another embodiment of a system 50 for reducing motion artifacts in analytic processing. Complex data from two different transmissions are input to the complex filters 12 where different relative phases are applied. The detectors 16 determine a magnitude of the combined data. The magnitudes are low pass filtered by the low pass filters 18. The maximum value is then selected by the comparator 20. The maximum value is used to control an indication of the relative phase associated with the maximum value. For example, a multiplexer 52 connected with a memory or other indicator of possible relative phases outputs the selected relative phase (e.g., 0, 90, −90 or 180) in response to the selection.

Where the same temporal gap applies to multiple combinations (e.g., a moving window for combining data from three or more lines results in the same temporal gap in two or more combinations), the relative phase is maintained. A multiplexer 54 outputs the selected relative phase to a buffer 56, such as a first-in, first-out buffer. The buffer 56 provides the previously selected relative phase to a summer 58. If no further temporal gaps resulting in additional relative phase adjustments have occurred, the previously selected relative phase is output by the summer 58, through the multiplexer 54. If an additional temporal gap occurs for a given combination (e.g., two or more gaps in one combination), the additional relative phase shift is output by the multiplexer 52. The additional relative phase angle is summed with the previous relative phase angle. The summed value is then output by the multiplexer 54. The output relative phase angle is converted to a coefficient to implement the phase shift by a look-up table or processor 60. The coefficient is applied to one set of data to be combined by the multiplier 62 for adjusting the relative phase. The data is phase shifted without combination. The system 50 is positioned prior to analytic filtering, interpolation or other processes.

Figure 3:
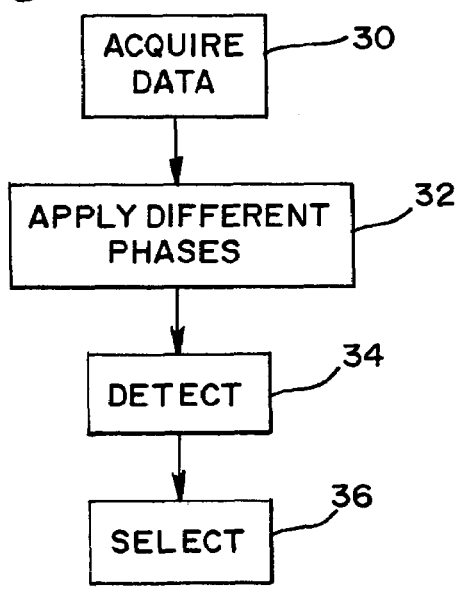
FIG. 3 is a flow chart diagram of one embodiment of a method for reducing motion artifacts in coherent image formation.

FIG. 3 shows one embodiment of a method for correcting phase errors due to motion in coherent image formation. Additional, different or fewer acts may be provided. The method shown in FIG. 3 is implemented by the system 10 of FIG. 2, the system 50 of FIG. 8 or a different system of any of various possible structures. In general, data is combined in multiple possible combinations associated with different relative phase angles to determine a combination with minimal or reduced cancellation due to motion. Coherent image formation even with delays between acquisitions of combined data may be preserved without rescan or frame rate penalties. Resolution and information content are maximized because analytic processing is performed with the maximum coherence. Less aggressive video filtering may be applied to eventually detected data, and cancellation of signal due to motion is minimized.

In act 30, data is acquired in response to multiple transmissions. For example, ultrasound data in the analytic domain, such as in-phase and quadrature or radio frequency data, is acquired. Data from different transmissions may be coherently aligned as a function of the phase relationship between the data. RF data can be aligned by applying relative phase shifts. Time shifts of ¼ or ½ of a center frequency carrier cycle correspond to phase shifts of 90 or 180 degrees, respectively. Complex data representing two or more scan lines is acquired at different times or in response to different transmissions. In one embodiment, complex data representing three or more scan lines is acquired. Two of the scan lines may be from a same transmission, such as receiving along two scan lines in response to a transmission along yet another scan line, or different transmissions. Another set of the complex data represents a scan line acquired in response to a different transmission.

At least two transmissions for acquiring at least two sets of analytic data to be combined are separated by about at least one millisecond in one embodiment. Lesser separation may be provided, such as a temporal separation of three hundred microseconds. Even greater temporal separation may be provided, such as 1.1 to 10 microseconds. The temporal separation allows acquisition along other lines within a two or three dimensional space for a same image in a same mode or for a same image in a different mode. For example, after every five or other number of B-mode associated transmissions, a delay is provided before a subsequent B-mode transmission for obtaining Doppler. The subsequent acts 32 through 36 are performed for any combination of analytic data associated with a sufficiently large temporal separation, such as data that is not sequentially acquired with minimal or no delay. The amount of expected tissue motion, transducer movement, depth of imaging and other factors may affect the amount of delay between any two scan lines for using acts 32 through 36. Where sufficient delay is provided to result in a motion artifact, acts 32 through 36 may be implemented.

In act 32, at least two different relative phases are applied between the analytic data to be combined. For example, 0 degree, 90 degree, −90 degree and 180 degree relative phase shifts are applied between two or more sets of complex data. Since the data to be combined is responsive to temporally different transmissions, the different phase shifts are spaced so as to sample possible or likely phase shifts due to motion. Multiple time shifts also could be used in act 32, particularly if RF data is acquired and processed in act 30.

In one embodiment, the different phase shifts are applied prior to combination using multipliers, selectors, subtractors, inverters, phase rotators or other devices. In alternative embodiments, the relative phase shifts are applied as part of a combination of the analytic data. For example, the same data representing one or more locations along the azimuthal dimension is combined in response to two or more different phases. The two different combinations are performed sequentially or in parallel. For example, the same data is input to two different complex filters. Weights or coefficients of the filters are operable to apply the different relative phase shifts as part of the combination. For example, the sign of one or both of the in-phase and quadrature information as well as the order of the in-phase and quadrature information of one set of complex data is altered prior to combination with the other set of complex data.

Any of various combinations are used. The combination used is the same as the analytic process desired for imaging, but may be a different combination than the analytic processing being performed for imaging. For example, the combination corresponds to synthesizing at least two sets of analytic data representing a same scan line, interpolating data for a scan line between scan lines represented by two or more sets of data, interpolating data as a line different from two lines represented by two sets of data, filtering across at least two lines represented by the data to be combined in the azimuthal or elevation dimensions, and combinations thereof. Any analytic processing combination of complex data may be used, including now known or later developed combinations. For a representative example, see U.S. Pat. Nos. 6,193,663, 5,623,928 and 5,667,373, the disclosures of which are incorporated herein by reference. The above-referenced patents use one or more of the filtering or synthesis without interpolation, interpolation, combination of synthesis and interpolation, filtering and combinations thereof. Another analytic process includes synthetic aperture. Transmissions and/or receptions using different apertures along a same scan line are performed. The resulting sets of complex data representing the same scan line are then combined coherently in an analytic process.

In act 34, the magnitude of the different combinations is detected. The magnitude is detected sequentially or in parallel. The squares of the magnitude, intensity, amplitude or other detection are performed in alternative embodiments. The combinations and associated detection are performed on an ongoing basis for different depth positions. In an alternative to a moving window embodiment, a single magnitude is detected for each of a plurality of subsets of all the possible depths.

In one embodiment, the detected magnitudes are low-pass filtered as a function of range. Low-pass filtering removes clutter or high frequency variation associated with noise and more likely isolates signals due to tissue or other imaging structure. Low-pass filtering is applied as a moving window along magnitudes representing all or a subset of depths. Alternatively, the low-pass filter 18 is applied in a same or different way for different blocks of data representing different ranges of depth.

In act 36, a selection associated with one of the different relative phases is performed. For example, a combination associated with a largest or greatest magnitude is selected. Selecting the combination corresponds to selecting a particular relative phase, selecting an output line, selecting particular data, or combinations thereof. In one embodiment, the selection is performed so that the pre-detected analytic data combined in response to the selected relative phase difference is passed on for further processing. In alternative embodiments, the selection is performed for combining data associated with different depths, different data or even data associated with different acquisitions. While the relative phase associated with a largest magnitude is selected in one embodiment, other characteristics resulting in a selection of a non-largest magnitude may be used. The selection is performed on detected, low-pass filtered information, but detected information without low-pass filtering or a characteristic other than magnitude of the signal may be used for performing the selection. As a result of the selection, analytic data is combined in response to a selected relative phase. For example, previously combined data associated with azimuthal or elevation analytic processing in response to a relative phase is selected for subsequent imaging. In another embodiment, data prior to combination is rotated by the selected relative phase. In yet other embodiments, the magnitude of low pass filter magnitude is selected and output for further processing.

Motion correction using different possible phases and selection of one phase is performed for analytic operations with a single or multiple temporal discontinuities. If the filters or analytic combinations of complex data include two or more temporal discontinuities, the combinations and selection may be adjusted to provide additional choices. For example, additional combinations and associated detection are performed for identifying a combination with the least cancellation due to motion artifact. As an alternative to performing many possible permutations of phase correction combinations (e.g. two temporal discontinuities with four possible phase differences providing 16 possible combinations), assumption of uniform motion may simplify processing. The phase differences are selected in accordance with likely or possible velocities. The same phase difference is applied to each of the two or more temporal discontinuities. For example, 0 degree, 90 degree, 180 degree or −90 degree phase differences apply to each temporal discontinuity. For a two temporal discontinuity example, four possible combinations in response to four different relative phases are provided. If the temporal discontinuities are likely to be associated with different motion or have different amounts of temporal discontinuity, additional combinations and associated relative phases may be used. For example, two different relative phases may be used for a single combination, where one relative phase is applied across one temporal discontinuity and the other relative phase is applied across a different temporal discontinuity of the combination.

While discussed above for the reduction of motion artifact, the generation of multiple possibilities and selection of a specific possibility in analytic processing may be used as an adaptive phase correction. Where phase correction is performed as a function of frequency dependent attenuation, geometric effects, or other factors, the phase is adaptively corrected without requiring calculated or specific corrections for any of various purposes. As another example, a phase correction using multiple possibilities and selecting one combination is performed for phase or pulse inversion harmonic imaging. Where the rejection of the fundamental, odd harmonics, even harmonics or other frequency band is desired, various phase shifts are applied and the combination is performed in response to each of the phase shifts. The combination associated with the maximum rejection of the desired frequency band is then selected. For measuring maximum rejection, a narrow band complex filter or other filter may be used to isolate the frequency content at the frequency to be rejected or the frequency to be maintained. For better rejection, additional relative phases and associated combinations are performed, such as in an iterative or search pattern. While discussed above for B-mode processes, multiple combinations and selection of one combination of analytic data may be performed for Doppler tissue imaging or other imaging modes.

In one embodiment, a three-dimensional representation is generated. The three-dimensional image is responsive to analytic processing along one or both of azimuthal and elevation dimensions. For example, a two-dimensional or other multi-dimensional array is used to acquire data representing scan lines at different azimuth and elevation positions. To reduce the number of transmissions while maintaining resolution, complex data from two or more different transmissions are combined analytically along the azimuth and elevation dimensions. Analytic interpolation and/or synthesis is provided in three-dimensional imaging.

Using multiple combinations with different phase angles and selecting an appropriate phase angle compensates for motion between the acquisitions of two different sets of data. In three-dimensional imaging, temporal discontinuities are likely between one or both of azimuthally and elevationally spaced scan lines. For example, FIGS. 4 and 6 show sequential transmissions in two different formats where four sets of data are received along four scan lines in response to each transmission as represented by the box 40. The plus (+) sign represents a receive line and the numbers or letters represent a transmit line. In FIG. 4, the transmission sequence proceeds sequentially along azimuthal rows. In one example embodiment represented by FIG. 4, 144 transmit lines are fired in a 12×12 grid. 250 microseconds separates each of the transmissions, providing a volume scan rate of about 27 Hertz. With a quad beam reception or receiving four beams in response to each transmission, approximately 24 scan lines of data are received along each of the elevation and azimuth dimensions. By interpolating a line between each of the actual receive lines, an additional 23 interpolated lines of data are provided along each dimension. Along the elevation dimension in the example shown in FIG. 4, 12 transmissions are performed between some pairs of elevationally spaced receive lines (e.g., rows 2 and 3; 4 and 5; 6 and 7). Along the azimuth dimension, few motion artifacts are likely due to the sequentially acquired analytic data.

Along the elevation dimension, temporal discontinuities are provided. As shown in FIG. 4, analytic line interpolation is provided. As shown by the elevation processing section of FIG. 4, a first row of received lines is used, another row of received lines is interpolated between the first and second received row of received lines. For interpolation between the second and third received lines, a temporal discontinuity is provided. Multiple phase angles are applied and a phase angle associated with the minimum amount of cancellation due to motion artifacts is then selected. As a result, analytic line interpolation or other analytic processing is provided along both the elevation and azimuthal dimensions.

The application of multiple possible different relative phase angles and selection of an appropriate combination is performed for temporal discontinuities of about three milliseconds, such as for interpolating the lines represented by the dots 42. In one embodiment, the complex filter combines two different sets of complex data for each interpolation. In other alternative embodiments, three or more sets of complex data are combined in each complex filter.

Data representing a same line may be synthesized analytically. In other embodiments, an azimuth filtering across multiple lines in either elevation or azimuth may be provided. In one embodiment for performing both a line synthesis as well as a line interpolation, the application of different possible phases and selection of a combination is performed for three out of every four elevationally spaced rows of lines. FIG. 5 graphically represents the combination along the elevation dimension. FIG. 5 shows eight rows spaced in elevation. For elevation processing along each column of lines, the first and second row lines are synthesized. A line is interpolated and synthesized from a combination of the first, second and third rows. A synthesis is then performed for a combination of the second and third rows. Another interpolation and synthesis combination is then performed using the second, third and fourth rows. As shown in FIG. 5, each of the processes with a choose label in the elevation processing section represents application of different relative phases and selection to reduce motion artifacts.

FIG. 6 represents a transmit sequence used to reduce the number of choose operations or the amount of applying different phase angles for a combination and selecting one of the combinations. As shown in FIG. 6, the transmit sequence proceeds in blocks. Analytic data is acquired along two elevationally spaced rows for the entire azimuth dimension in a zig-zag fashion. In the example of FIG. 6, transmit sequences are fired along 1 through 9 sequentially and then A through J sequentially. Minimal motion artifact may result when analytic processing complex data associated with temporal discontinuity between every other transmission. For example, 250 microseconds separate each transmission so that analytic processing along the azimuth dimension for the first and third transmission is associated with about a 500 microsecond temporal discontinuity. The application of different phase angles and combinations is not performed in one embodiment for such small temporal discontinuities, but may be performed in alternative embodiments. A large temporal discontinuity exists between the elevation rows of different blocks. For example, the combination along the elevation dimension of complex data responsive to the second transmission and the B transmission may have a temporal discontinuity of 2,250 microseconds. For analytic processing across that temporal discontinuity, multiple combinations in association with multiple different phase angles are performed and the maximum magnitude combination is selected.

Other transmission sequences may be used, including transmission sequences in two- or three-dimensional imaging that require re-scanning of one or more lines due to a sufficiently large temporal discontinuity. Where the temporal discontinuity is so large that the data may be incoherent, a re-scan is performed. For other temporal discontinuities, multiple possible combinations are performed and one is selected for minimizing motion artifact.

In an alternative embodiment for use with either two- or three-dimensional imaging, analytic filtering without interpolation is provided. Complex data from at least two acquisitions along a same or different scan lines is filtered. Motion between acquisitions of the two sets of complex data is identified, such as by estimating a Doppler velocity associated with the spatial location. The estimated motion information is then used to determine a relative phase angle between the sets of data. The relative phase angle is then used to avoid motion artifacts. As an alternative to a feedback of the motion calculation, combinations in response to different possible relative phase angles are performed as discussed above. The filtering is adjusted as a function of the relative phase angle, such as a phase angle calculated from Doppler information or a phase angle selected from a plurality of combinations responsive to different phase angles. The adjustment and filtering are performed by selecting an output of one of multiple possible filters or by performing a filtering operation in response to a selected relative phase angle.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

I claim:

1. A method for correcting phase errors in coherent image formation, the method comprising:

(a) applying at least two different relative phases, each of the at least two different relative phases applied between first and second analytic data received in response to temporally different transmissions, the applying comprising shifting the first analytic data relative to the second analytic data by a first of the at least two different relative phases and shifting the first analytic data relative to the second analytic data by a second of the at least two different relative phases, the first and second analytic data representing at least one scan line;
- (b) selecting information associated with one of the at least two different relative phases, the selecting being a function of a result of the application of the at least two different relative phases; and
- generating an image as a function of the information.

2. The method of claim 1 wherein (a) comprises applying 0 degree, 90 degree, −90 degree and 180 degree relative phase shifts between the first and second analytic data.

3. The method of claim 1 wherein (b) comprises selecting a combination of the first and second analytic data responsive to the one of the at least two different relative phases.

4. The method of claim 1 wherein the first and second analytic data is ultrasound data, further comprising:
- (c) azimuthally combining the first and second analytic data in response to a first phase;
- (d) azimuthally combining the first and second analytic data in response to a second phase different than the first phase;
- (e) detecting first and second magnitudes from the combinations of (c) and (d), respectively;
- wherein (b) comprises selecting in response to a largest of the first and second magnitudes.

5. The method of claim 4 further comprising:
- (f) low pass filtering the first and second magnitudes as a function of range, wherein (b) comprises selecting one of (c) and (d) in response to the low pass filtered first and second magnitudes.

6. The method of claim 1 further comprising:
- (c) acquiring the first and second data in response to first and second respective transmissions separated by about at least 1 millisecond.

7. The method of claim 1 wherein the first and second analytic data is ultrasound data, further comprising:
- (c) azimuthally combining the first and second analytic data in response to the selected one of the at least two phases, the combination corresponding to at least one of: (1) synthesizing the first and second analytic data representing a same line, (2) interpolating the first and second analytic data as a line between two lines represented by the first and second data, respectively, (3) interpolating the first and second analytic data as a line different than two lines represented by the first and second data, respectively, and (4) azimuthally filtering across at least two lines represented by the first and second data, respectively.

8. The method of claim 1 further comprising:
- (c) applying at least two different relative phases between the second and third analytic data, the third analytic data received in response to a temporally different transmission than the first and second data; and
- (d) selecting associated with one of the at least two different relative phases for with the second and third analytic data.

9. The method of claim 1 wherein the first and second analytic data is ultrasound data, and wherein the first data represents a first receive line spaced in elevation from a second receive line represented by the second data.

10. The method of claim 1 further comprising:
- (c) generating a three-dimensional representation responsive to the selection of (b).

11. The method of claim 10 wherein the first and second analytic data is ultrasound data, further comprising:
- (d) elevationally combining the first and third analytic data in response to the selected one of the at least two phases, the combination corresponding to at least one of: (1) synthesizing the first and second analytic data representing a same line, (2) interpolating the first and second analytic data as a line between two lines represented by the first and second data, respectively, (3) interpolating the first and second analytic data as a line different than two lines represented by the first and second data, respectively, and (4) azimuthally filtering across at least two lines represented by the first and second data, respectively; and
- (e) azimuthally combining analytic data.

12. The method of claim 10 wherein the first and second analytic data is ultrasound data, wherein (c) comprises generating the three-dimensional representation responsive to motion compensated analytic interpolation along both elevation and azimuth dimensions, the elevation motion compensated analytic interpolation responsive to the selection of (b).

13. The method of claim 1 wherein the first and second analytic data is ultrasound data, wherein (a) comprises inputting the first and second data into a respective at least two complex azimuth filters, both the first and second data input to each of the at least two complex azimuth filters wherein weights of the filters are operable to apply the at least two different relative phases between the first and second data, the at least two complex azimuth filters responsive to different of the at least two different relative phases; and
- wherein (b) comprises selecting as a function of detected outputs of the at least two complex azimuth filters.

14. The method of claim 1 further comprising:
- (c) performing (a) and (b) for less than all detected lines of an image.

15. A method for correcting phase errors in coherent image formation, the method comprising:
- (a) analytically processing ultrasound data representing scan lines spaced in both the azimuth and elevation dimensions;
- (b) compensating for motion between at least first and second analytic data for first and second scan lines, respectively, as a function of a relative phase angle, the first and second scan lines spaced along one of: the elevation dimension and the azimuth dimension; and
- imaging as a function of the motion compensated ultrasound data.

16. The method of claim 15 wherein (b) comprises:
- (b1) applying at least two different relative phases between the first and second analytic data received in response to temporally different transmissions, one of the at least two different relative phases being the relative phase angle; and
- (b) selecting associated with one of the at least two different relative phases.

17. The method of claim 15 wherein (a) comprises forming interpolated lines along both the azimuth and elevation dimensions;
- further comprising:
- (c) generating a three-dimensional representation responsive to (a) and (b).

18. The method of claim 15 wherein (a) comprises forming interpolated lines along the elevation dimension.

19. A system for correcting phase errors in coherent image formation, the system comprising:
- a complex filter operable to receive first and second data and operable output third data responsive to a combination of the first and second data with a first relative phase angle and fourth data responsive to a combination of the first and second data with a second relative phase angle, the first relative phase angle different than the second relative phase angle;

a detector operable to detect the third and fourth data;

a switch operable to select one of the third and fourth data in response to the detector; and a medical diagnostic ultrasound system operable to display an image as a function of the selected one of the third and fourth data, the image associated with at least one corrected phase error due to the selection by the switch.

20. The system of claim 19 wherein the complex filter comprises a plurality of complex filters each operable to combine the first and second data in response to different relative phase angles.

21. The system of claim 19 wherein the detector comprises a plurality of detectors each operable to detect a respective one of the third and fourth data.

22. The system of claim 19 wherein the switch comprises a multiplexer having inputs connected to outputs of the complex filter, the multiplexer operable to select one of the outputs in response to a comparison of the detected third and fourth data.

23. The system of claim 19 further comprising:

a low pass filter operable to low pass filter outputs of the detector, the switch responsive to the low pass filtered output of the detector.

24. The system of claim 19 further comprising:

a control processor operable to control the complex filter and the switch to output the third data for first and second data acquired sequentially with less than a first temporal separation and operable to control the complex filter and the switch to output one of the third and fourth data in response to the detector for the first and second data acquired sequentially with more than the first temporal separation.

25. The system of claim 19 wherein the complex filter comprises four complex filters each responsive to a different phase angle, wherein the detector comprises four detectors each operable to magnitude detect an output from a respective one of the four complex filters.

* * * * *